United States Patent [19]
Delcroix et al.

[11] Patent Number: 6,003,549
[45] Date of Patent: Dec. 21, 1999

[54] FLOW MEASURING DEVICE

[76] Inventors: Jean-Louis Delcroix, Avenue Meynard, Villa No. 12, F-84600 Valreas; Xavier Renahy, 2, Avenue du Lac, F-70000 Vaivre-Montoille, both of France

[21] Appl. No.: 08/930,875
[22] PCT Filed: Mar. 29, 1996
[86] PCT No.: PCT/EP96/01379
  § 371 Date: Mar. 13, 1998
  § 102(e) Date: Mar. 13, 1998
[87] PCT Pub. No.: WO96/31760
  PCT Pub. Date: Oct. 10, 1996

[30] Foreign Application Priority Data

Apr. 7, 1995 [DE] Germany ............................ 195 13 055

[51] Int. Cl.$^6$ ................ G01F 1/00; F17C 13/00
[52] U.S. Cl. ................. 137/614.11; 137/613; 73/861.52; 73/863.01
[58] Field of Search ............................ 137/614.11, 613, 137/614.14; 73/861.55, 861.56, 861.57, 209, 861.52, 861.53, 863.01, 863.86, 863.72; 251/208, 310; 264/40.6

[56] References Cited

U.S. PATENT DOCUMENTS

| | | | |
|---|---|---|---|
| 3,342,068 | 9/1967 | Metzger | 73/209 |
| 3,604,445 | 9/1971 | Jordan | 137/613 |
| 3,633,421 | 1/1972 | Phillips | 251/208 |
| 3,691,835 | 9/1972 | Metzger | 73/209 |
| 3,863,690 | 2/1975 | Dean | 137/614.11 |
| 3,895,651 | 7/1975 | Okada et al. | 137/614.11 |
| 3,974,857 | 8/1976 | Hehl | 137/559 |
| 4,139,177 | 2/1979 | Hanning | 249/66 |
| 4,162,894 | 7/1979 | Tribble | 137/614.11 |
| 4,177,238 | 12/1979 | Allen | 264/328 |
| 4,236,518 | 12/1980 | Floyd | 137/614.14 |
| 4,245,513 | 1/1981 | Clements et al. | 73/861.55 |
| 4,550,744 | 11/1985 | Igashira et al. | 137/614.11 |
| 4,559,834 | 12/1985 | Phillips et al. | |
| 4,912,338 | 3/1990 | Bingham | 137/613 |
| 5,017,315 | 5/1991 | Kumazaki | 264/40.1 |
| 5,108,672 | 4/1992 | Sasaki et al. | 264/40.5 |
| 5,389,721 | 3/1995 | Pryor | 137/613 |
| 5,402,686 | 4/1995 | Wittmann | 73/861.55 |
| 5,460,761 | 10/1995 | Larsson | 264/39 |
| 5,591,385 | 1/1997 | Arai et al. | 264/40.6 |
| 5,678,602 | 10/1997 | Cannet et al. | 137/613 |

FOREIGN PATENT DOCUMENTS

| | | |
|---|---|---|
| 0171004 | 2/1986 | European Pat. Off. |
| 0414898 | 3/1991 | European Pat. Off. |
| 2228768 | 1/1973 | Germany |
| 7346103 | 12/1973 | Germany |
| 3509718 | 3/1994 | Germany |
| 4242024 | 6/1994 | Germany |
| 4204327 | 7/1992 | Japan |
| 2242007 | 3/1991 | United Kingdom |
| 9215439 | 3/1992 | WIPO |

*Primary Examiner*—Denise L. Ferensic
*Assistant Examiner*—Joanne Y. Kim
*Attorney, Agent, or Firm*—Robert W. Becker & Associates

[57] ABSTRACT

A flow measuring device, especially for coolant guided through injection molds, is provided. The flow measuring device has a coolant inlet, a coolant outlet leading to an injection mold, a shut-off valve disposed between the coolant inlet and the coolant outlet, a flow meter having an inlet for receiving coolant from the injection mold and an outlet, a flow control valve disposed upstream of the outlet of the flow meter, and a common control mechanism for the shut-off valve and the flow control valve.

16 Claims, 2 Drawing Sheets

FLOW MEASURING DEVICE

BACKGROUND OF THE INVENTION

The present invention relates to a flow measuring device, especially for coolant guided through injection molds.

Flow measuring devices are always required when the quantity of flow of a fluid through an apparatus, for example the quantity of a coolant through an injection mold, is to be controlled or regulated.

Commercially available flow measuring devices for coolant guided through injection molds have a complicated construction, have an impractical construction with respect to their various connections, and require separate controls for a generally available shut-off valve, which is disposed upstream of the injection mold, and for a flow control valve, which is disposed downstream of a flow meter that is a part of the flow control valve.

It is therefore an object of the present invention to provide a flow measuring device that has a simple and easy to understand construction, the connections of which are grouped in a logical and space-saving manner and require no separate control of the valves that are present on the flow measuring device.

SUMMARY OF THE INVENTION

Starting from this objective it is proposed with a flow measuring device of the aforementioned type having a coolant inlet and a coolant outlet to the injection mold that pursuant to the present invention there be provided a shut-off valve between the coolant inlet and the coolant outlet, a flow meter having an inlet for coolant coming from the injection mold and an outlet adjacent the coolant inlet, a flow control valve ahead of the outlet that is adjacent to the coolant inlet, and a common control means or mechanism for the shut-off valve and the flow control valve. In this connection, the coolant inlet can preferably be disposed adjacent to the outlet, the shut-off valve adjacent to the flow control valve, and the common control mechanism in or on a valve block.

In this way, the connections for the coolant are disposed very close to one another on the valve block, so that in a logical and space-saving manner the connection to a coolant supply line, a coolant return line, a connecting line from the valve block to an injection mold, and a return line from the injection mold can be established in a simple manner.

It is particularly advantageous if the coolant inlet and the outlet disposed adjacent thereto be disposed in the valve block as parallel through-bores that extend from one side face to the parallel other side face, since then several valve blocks having aligned and sealed bores can be bolted together at their adjoining side faces.

From each of these bores, respective parallel bores can branch off perpendicularly, with one leading to the coolant inlet and the other establishing the connection to the flow meter and accommodating the shut-off valve and the flow control valve, which are preferably disposed coaxially on a shaft that is perpendicular to the bores.

The flow meter can preferably be a float element flow meter having a conical, vertical tube that at least in a portion as viewed in the longitudinal direction is transparent and graduated, with a float element being disposed in the tube; the upper end of the tube is disposed in a sealed manner in the valve block ahead of the flow control valve, and the lower end is detachably held by a carrier that is connected to the valve block, with the inlet for the coolant that comes from the injection mold being disposed directly at the lower end of the tube.

A particularly straightforward and easy to seal off embodiment of the shut-off valve and of the flow control valve can have coaxially disposed, rotatable plugs, whereby for better control of the fluid flow through the flow control valve, the flow cross-section of the shut-off valve can be greater than that of the flow control valve.

In addition to this measure, or in place of the different flow cross sections, is also possible for the opening cross-section of the shut-off valve to increase more rapidly than does that of the flow control valve upon actuation of the common control mechanism.

The simplest common control mechanism can comprise a shaft that is coaxial to the plugs, by means of which the plugs can be coupled together, whereby these plugs can be simultaneously opened and closed by a control knob either directly or accompanied by the interposition of a gear arrangement.

In order to achieve a state where the shut-off valve constantly exposes a cross-sectional area of such a magnitude that the pressure loss in the shut-off valve is negligible relative to that in the flow control valve, it is also possible for the shut-off valve and flow control valve to be coupled together in such a way that first the shut-off valve and thereafter the flow control valve are opened.

This can be achieved, for example, by a cam control for the shut-off valve and for the flow control valve that can preferably be embodied in such a way that an axially displaceable, driveable wheel is disposed on the coaxial shaft between the two plugs, whereby this wheel is provided on each side face with a cam-like elevation that cooperates with corresponding abutments on the valve block; the elevations are offset relative to one another by at least 90° in such a way that upon rotation the wheel is axially shifted in the direction of the shut-off valve or in the direction of the flow control valve and then by means of driver means that can be coupled thereby either the plug of the shut-off valve or the plug of the flow control valve is rotated.

The cam-like elevations can be disposed on the side faces of the wheel in such a way that first the shut-off valve is coupled with the wheel, while the flow control valve is uncoupled, so that a first rotation of the wheel, for example by 90°, effects the complete opening of the plug of the shut-off valve, whereafter the wheel is uncoupled from the shut-off valve and is coupled with the flow control valve, as a result of which a further rotation of the wheel effects the sensitive controllable opening of the flow control valve.

In particular, the driver means can comprise driver discs that are fixedly disposed on the shaft that is connected with the plug, on both sides of the base, with each driver disc having an axially parallel bore on each side of the wheel and axially parallel coupling pins that can be brought into and out of engagement with one or the other of the bores by the axial displacement of the wheel.

If these coupling pins are spring mounted in an axially parallel bore in the wheel, the wheel can be axially shifted by the cam-like elevations without jamming occurring between the driver discs.

In order to be able to drive the wheel in a simple manner, it can be embodied as a gear wheel and can be rotated by a pinion on an axially parallel shaft by means of a control knob. The width of the gear wheel must then exceed the width of the pinion approximately by the axial path of displacement toward both sides.

For the particularly sensitive control of the quantity of flow through the flow control valve, at least the opening in the plug of the flow control valve or the passage opening in the valve housing can have an elliptical cross-sectional area with the small axis extending in the direction of the axis of rotation and the major axis extending perpendicular thereto.

BRIEF DESCRIPTION OF THE DRAWINGS

The present invention will be described in detail subsequently with the aid of a number of specific embodiments illustrated in the drawing.

DESCRIPTION OF PREFERRED EMBODIMENTS

Figure 1:
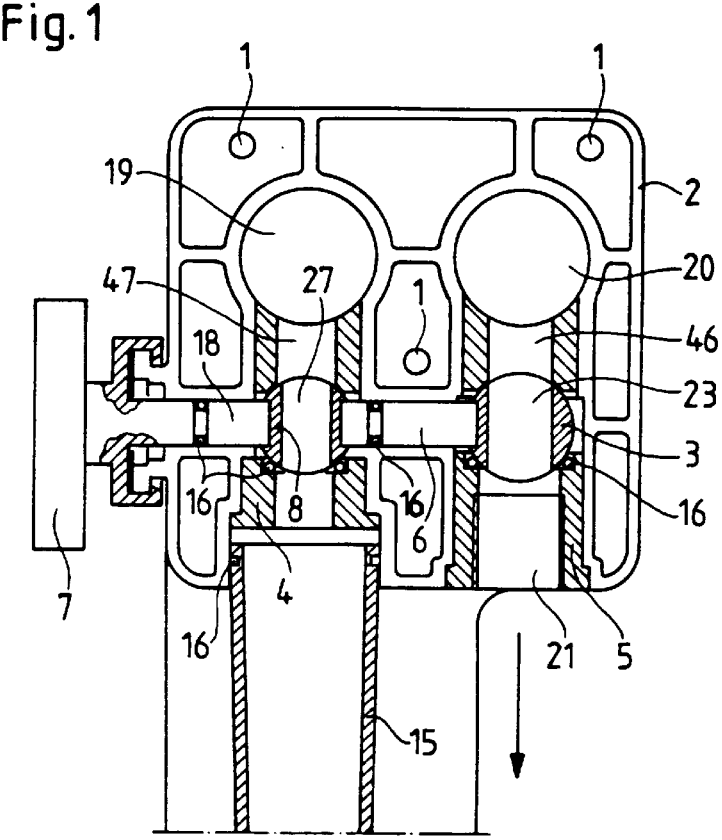
FIG. 1 a cross-sectional view of a first exemplary embodiment of the flow measuring device, FIG. 2 a cross-sectional view of the valve block of a second exemplary embodiment, FIG. 3 a detail view of the opening cross-section of the flow control valve of FIG. 2, and FIG. 4 a cross-sectional view of the valve block of a third exemplary embodiment.
Figure 1:
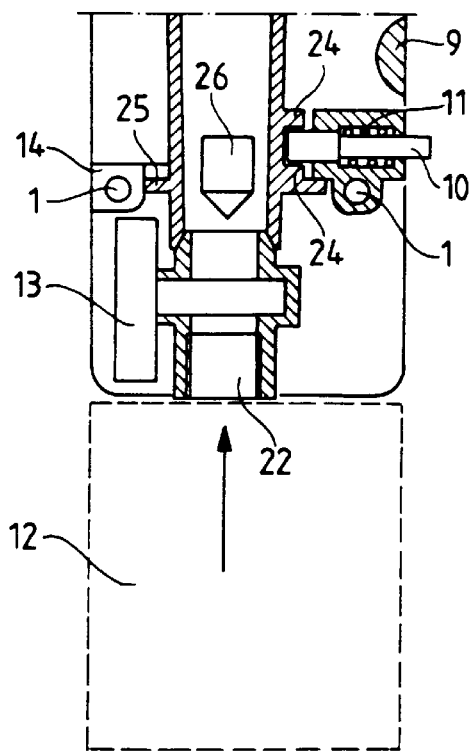

The inventive flow measuring device has a valve block 2 that is provided with holes 1 in order to fasten together a number of valve blocks 2, or in order to fasten non-illustrated cover plates and/or a carrier plate 9 with side surfaces of the valve block 2.

The valve block 2 has a through-bore 19 that extends from one side surface to the other and forms a coolant outlet. Disposed parallel thereto is a further through-bore 20 that forms a coolant inlet. Branching off from the bores 19, 20 are perpendicular bores 46, 47 that also extend parallel to one another and that form receiving means for a spherical plug or stopcock 3 of a shut-off valve and for a spherical plug or stopcock 8 of a flow control valve.

The spherical plugs 3, 8 are held in the bores 46, 47 by means of sleeves 4, 5, and are sealed by means of O-rings 16.

The axis of rotation of the spherical plugs 3, 8 extends perpendicular to the center lines 46, 47. Disposed coaxial to this axis of rotation is a shaft 6 that by means of projections 30 illustrated in FIG. 3 engages in corresponding slots in the spherical plugs 3, 8 and in this manner establishes a fixed coupling between the spherical plugs 3, 8. The shaft 6 is also sealed in its bore by an O-ring 16.

A further shaft 18, which is coaxial to the axis of rotation of the spherical plugs 3, 8 engages via its projection into a slot in the spherical plug 8 and is guided out of the front side of the valve block 2, where it ends in a control knob 7. An O-ring seal 16 is disposed on the shaft 18.

To ensure that the shaft 18 is protected against axial displacement, the control knob 7 is provided with detents that interengage corresponding projections on the valve block 2.

In this embodiment, the spherical plug 8 of the flow control valve is actuated directly by the control knob 7 via the shaft 18 and in so doing at the same time takes along the spherical plug 3 of the shut-off valve via the shaft 6.

Since the cross-sectional area of the opening 23 in the spherical plug 3 of the shut-off valve is larger than the cross-sectional area of the opening 27 in the spherical plug 8 of the flow control valve, the cross-section of flow passage of the shut-off valve is in every position so much greater than the cross-section of flow passage of the flow control valve that it is possible to control the quantity of flow of the fluid by means of the flow control valve without this being affected by the pressure loss in the shut-off valve.

The carrier plate 9 serves as a holding means for the flowmeter which is in the form of a conical, transparent tube 15, the upper end of which is inserted into a bore ahead of the sleeve 4 in the valve block 2, and is sealed by means of an O-ring 16. At the bottom end, the tube 15 is provided with detents 24 into which engage a locking pin 10 that is displaceable by means of a spring 11 and is mounted on the carrier plate 9.

Lugs 14 are disposed on the carrier plate 9, with the height of the lugs corresponding to the width of valve block 2 and being provided with holes 1 by means of which, as already described in conjunction with the valve block 2, a number of flow measuring devices can be placed next to one another and interconnected. The tube 15 is centered between the lugs 14 by means of a flange 25.

Disposed at the free, lower end of the tube 15 are a thermometer 13 as well as a coolant inlet, which is embodied as a fastening fitting 22 and serves for receiving coolant coming from a non-illustrated injection mold.

Instead of connecting the coolant line that comes from an injection mold directly to the fastening fitting 22, an electronic flow regulator 12, which is illustrated by dashed lines, can also be interposed.

The coolant that comes from a non-illustrated coolant source is connected to the coolant inlet 20, flows through the bore 46, the opening 23 and the spherical plug 3, and from there passes via a coolant outlet 21 to a non-illustrated injection mold. From there, the warmed-up coolant flows through the inlet 22 into the tube 15. This tube 15 has a conical configuration and contains a float element 26 that in conformity with the quantity of flow and the thereby resulting flow velocity is raised by the coolant and remains at a height or position in the tube 15 that is proportional to the quantity of flow. The tube 15 can be provided with a scale that can be calibrated to the quantity of flow of the coolant.

To achieve a particularly sensitive adjustment of the quantity of flow, a spherical plug 28 for the flow control valve can be provided (FIG. 2), whereby it has an opening 29 with an elliptical cross-sectional area, the small axis extending in the direction of the axis of rotation of the spherical plug 28 and the major axis extending perpendicular thereto.

Figure 2:
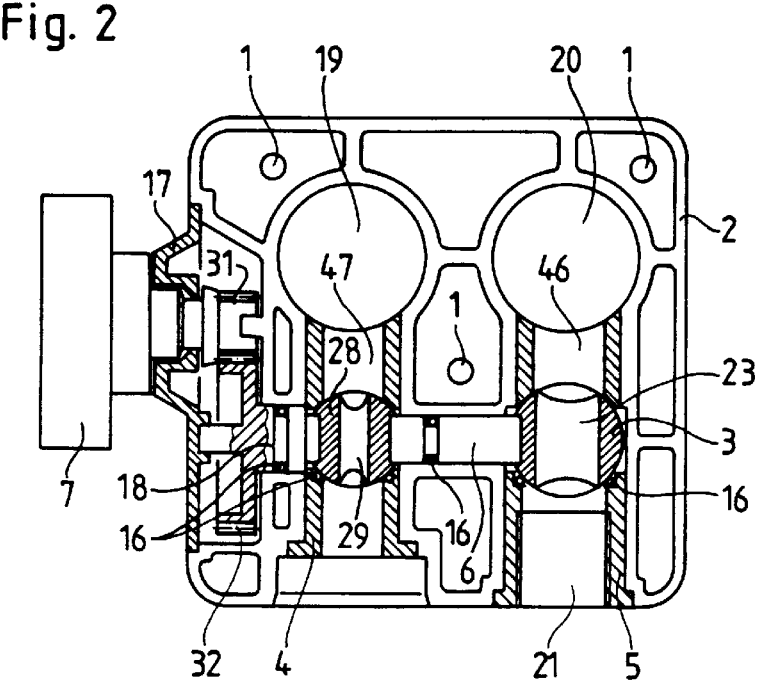

Pursuant to the specific embodiment illustrated in FIG. 2, disposed on a coaxial shaft 18 that is coupled with the spherical plug 28 is a gear wheel 32 that meshes with a pinion 31. This pinion is rotated by the control knob 7. The control knob 7, together with the pinion 31, are disposed in a cover 17 that is screwed or adhesively connected to the valve block 2.

By means of the gearing 31, 32, a rotation of the control knob 7 by about 300° corresponds to a rotation of the spherical plugs 3, 28 of about 90°. This, in conjunction with the opening 29 that has an elliptical cross-sectional area in the spherical plug 28, results in the ability to very finely adjust the flow control valve.

Figure 4:
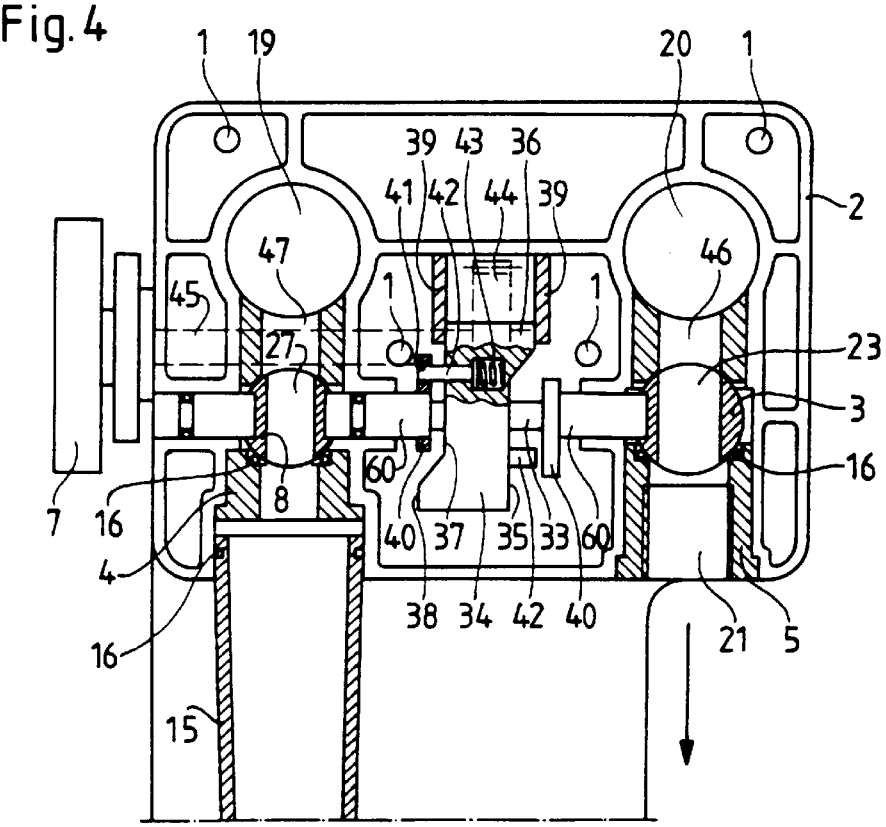

The embodiment illustrated in FIG. 4 is embodied in such a way that with a rotation of the control knob 7 the spherical plug 3 of the shut-off valve is first opened, and only thereafter is the spherical plug 8 of the flow control valve actuated. This is achieved by a cam control means that is disposed between shaft stubs 60 that drive the spherical plug 3 and the spherical plug 8. The shaft stubs 60 are kept spaced apart by means of a coaxial shaft 33 of smaller diameter, yet without being rotatably coupled by this shaft 33.

Disposed on the shaft 33 is an axially displaceable gear wheel 34, one side face 35 of which has disposed thereon a cam-like elevation 36 and the other side face 37 of which has disposed thereon a cam-like elevation 38.

Disposed in the valve block 2 are integral, spaced-apart abutments 39, the spacing of which corresponds to the width of the gear wheel 34 plus the height of the cam-like elevations 36, 38.

Rotatably disposed on each shaft stub 60 is a driver disc 40, each of which is provided with an axially parallel bore 41. Disposed in the gear wheel 34 are axially parallel coupling pins 42 that project out of the side faces 35, 37 and can be brought into engagement with the bores 41. The coupling pins 42 are acted upon by a compression spring 43.

Meshing with the gear wheel 34 is a further gear wheel 44 that is disposed on an axially parallel shaft 45 and can be rotated by means of a control knob 7.

The cam-like elevations 36, 38, the bores 41 in the driver discs 40, and the coupling pins 42 in the gear wheel 34 are disposed in such a way that when the control knob is rotated, and hence the gear wheel 34 is initially shifted toward the right, the appropriate coupling pin 42 comes into engagement with the corresponding bore 41 in the driver disc 40 and the spherical plug 3 is rotated into the opening position illustrated in FIG. 4. When this opening position is achieved, the gear wheel 34 is shifted to the left by the cam-like elevation 36, which now together with the gear wheel 34 is disposed between the abutments 39, so that in the illustrated manner the coupling pin 42 engages in the bore 41 of the driver disc 40, while the coupling pin 42 disengages from the driver disc 40 of the spherical plug 3, so that now the spherical plug 8 can open and be brought into the position illustrated in FIG. 4 without the spherical plug 3 of the shut-off valve having to thereby move.

Figure 3:
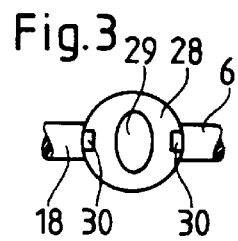

Since with the use of spherical plugs 3, 8 a rotation of only about 90° is necessary from the completely closed into the completely open position and vice versa, the cam-like elevations 36, 38 on the side faces 35, 37 of the gear wheel 34 are disposed in such a way that the uncoupling of the spherical plug 3 and the coupling of the spherical plug 8 are effected after a rotation of about 90°. After a further rotation of about 90° the spherical plug 8 is then completely opened, so that during this second portion of the rotation a sensitive adjustment of the quantity of flow by means of the spherical plug 8, which could have an opening with an elliptical cross-sectional area as illustrated in FIG. 3, can be achieved. The difference in diameter between the opening 23 in the spherical plug 3 and the opening 27 in the spherical plug 8 contributes to the fact that there can be no effect of the control of the quantity of flow from the shut-off valve having the spherical plug 3.

The present invention is not limited to a shut-off valve and a flow control valve having spherical plugs, but rather other valves having rotatable plugs or also cam-controlled check valves can be used where the cams for the shut-off valve are embodied in such a way that a rapid opening and closing is effected, while the cam for the flow control valve can have a slowly rising ramp that effects a gradual opening for the control of the flow by the flow control valve.

The inventive flow measuring device can be used particularly advantageously in conjunction with the apparatus for selectively acting upon molds for processing synthetic material with a liquid or a pressurized gas pursuant to German Patent 42 42 024.

The present invention is, of course, in no way restricted to the specific disclosure of the specification and drawings, but also encompasses any modifications within the scope of the appended claims.

What we claim is:

1. A flow measuring device for coolant guided through injection molds, comprising:
    a coolant inlet for receiving coolant;
    a coolant outlet leading to an injection mold;
    a shut-off valve disposed between said coolant inlet and said coolant outlet;
    a flowmeter having an inlet for receiving coolant from said injection mold, and an outlet;
    a flow control valve disposed upstream of said outlet of said flowmeter; and
    a common control mechanism for said shut-off valve and said flow control valve, wherein when both of said valves are opened and a flow of said coolant is set by means of said flow control valve, said shut-off valve constantly has a cross-sectional area of such a magnitude that a pressure loss in said shut-off valve is negligible relative to a pressure loss in said flow control valve.

2. A flow measuring device according to claim 1, which further comprises a valve block on or in which are disposed said coolant inlet adjacent to said outlet of said flow control valve, said shut-off valve adjacent to said flow control valve, and said common control mechanism.

3. A flow measuring device according to claim 2, wherein said flowmeter is embodied as a float element flowmeter and includes a conical graduated vertical tube that is transparent in the longitudinal direction at least in portions thereof, and also includes a float element that is disposed in said tube, wherein an upper end of said tube is sealingly disposed in said valve block upstream of said flow control valve, wherein a lower end of said tube is detachably held by a carrier member that is connected to said valve block, and wherein said inlet of said flowmeter is disposed directly at said lower end of said tube for coolant coming from said injection mold.

4. A flow measuring device according to claim 2, wherein said shut off valve and said flow control valve are provided with coaxially disposed, rotatable plugs.

5. A flow measuring device according to claim 4, wherein said shut off valve has a flow cross-section that is greater than a flow cross-section of said flow control valve.

6. A flow measuring device according to claim 4, wherein said shut off valve has an opening cross-section that upon actuation enlarges more rapidly than does an opening cross-section of said flow control valve.

7. A flow measuring device according to claim 6, wherein said plugs of said shut off valve and said flow control valve are coupled to one another by means of one or more coaxial shafts and are simultaneously opened and closed by a control knob either directly or accompanied by the interposition of a gear mechanism.

8. A flow measuring device according to claim 7, wherein said shut off valve and said flow control valve are coupled with one another in such a way that first said shut off valve and thereafter said flow control valve are opened, wherein an axially displaceable, driveable wheel is disposed upon said coaxial shaft between said two plugs, wherein on each side face of said wheel there is disposed a respective cam-like elevation that cooperates with corresponding abutments on said valve block, and wherein said elevations are offset relative to one another by at least 90° such that upon rotation said wheel is shifted axially in the direction of said shut off valve or in the direction of said flow control valve and then by means of drive means that are adapted to be coupled by said shifting of said wheel, either said plug of said shut off valve or said plug of said flow control valve is rotated.

9. A flow measuring device according to claim 8, wherein a respective driver disk is disposed on said shaft on both sides of said wheel, wherein each driver disk is provided with an axially parallel bore, and wherein respective axially parallel coupling pins are disposed on each side face of said wheel and are adapted to be brought into and out of engagement with said bores of said driver disks by means of said axial displacement of said wheel.

10. A flow measuring device according to claim 9, wherein said coupling pins are spring mounted in respective axially parallel bores in said wheel.

11. A flow measuring device according to claim 9, wherein said wheel is embodied as a gear wheel, and wherein said gear wheel is rotated by a further gear wheel that is disposed on an axially parallel shaft and is in turn rotated by a control knob.

12. A flow measuring device according to claim 2, wherein said shut off valve and said flow control valve are coupled with one another in such a way that first said shut off valve opens and thereafter said flow control valve opens.

13. A flow measuring device according to claim 12, wherein said common control mechanism includes a cam control means for said shut off valve and for said flow control valve.

14. A flow measuring device according to claim 12, wherein at least one of an opening in said plug of said flow control valve or a passage opening in a housing of said valve is provided with an elliptical cross-sectional area, wherein the small axis extends in the direction of an axis of rotation of said plug and the major axis extends perpendicular thereto.

15. A flow measuring device according to claim 2, wherein said coolant inlet and said outlet of said flow meter that is disposed adjacent thereto are disposed in said valve block as parallel through-bores that extend from one side face to a parallel other side face such that a plurality of valve blocks can be bolted together when sides surfaces thereof are disposed adjacent to one another and said coolant inlet and said outlet of said flow meter are aligned and sealed off, wherein further bores are provided that branch off perpendicularly from said coolant inlet and said outlet of said flow meter and extend parallel to one another in said valve block, wherein one of said further branch bores leads to said coolant outlet and the other of said further branch bores establishes said connection to said flow meter, and wherein said shut off valve and said flow control valve are disposed in respective ones of said further branch bores.

16. A flow measuring device according to claim 15, wherein said shut off valve and said flow control valve are coaxially disposed on a shaft that extends perpendicular to said further branch bores.

* * * * *